(12) United States Patent
Cummins et al.

(10) Patent No.: US 11,254,692 B2
(45) Date of Patent: Feb. 22, 2022

(54) METHOD FOR PRODUCING TRICHLOROSILYLSULFIDE ANION AND ITS USE IN THE PREPARATION OF ORGANOSULFUR COMPOUNDS

(71) Applicant: MASSACHUSETTS INSTITUTE OF TECHNOLOGY, Cambridge, MA (US)

(72) Inventors: Christopher C. Cummins, Dorchester, MA (US); Michael Bailey Geeson, Boston, MA (US); Wesley Transue, Cambridge, MA (US); Pablo Rios Moreno, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 17/259,679

(22) PCT Filed: Nov. 8, 2018

(86) PCT No.: PCT/US2018/059811
§ 371 (c)(1),
(2) Date: Jan. 12, 2021

(87) PCT Pub. No.: WO2020/013877
PCT Pub. Date: Jan. 16, 2020

(65) Prior Publication Data
US 2021/0130375 A1    May 6, 2021

Related U.S. Application Data

(60) Provisional application No. 62/697,037, filed on Jul. 12, 2018.

(51) Int. Cl.
*C07F 7/12* (2006.01)
(52) U.S. Cl.
CPC ................... *C07F 7/126* (2013.01)

(58) Field of Classification Search
CPC ......... C07F 7/126; C07F 7/081; C07F 7/0812
See application file for complete search history.

(56) References Cited

PUBLICATIONS

Stone (Journal of the American Chemical Society, 1957, 79, 1840-1843).*
Geeson (Journal of the American Chemical Society, 2019, 141,6375-6384).*
Mueller et al. "Preparation and Synthesis of Thiotrichloro Silicate and Germanate. Crystal Structure of NEt4[SiCL3].05 CCI4", Zeitschrift fur Naturforschung B, Aug. 1, 1985 (Aug. 1, 1985), vol. 40, pp. 1015-1019; p1015, English Abstract is considered.
Cai et al. "Formation of silanethiols by reaction of silanes with carbonyl sulfide: implications for radical-chain reduction of thiocarbonyl compounds by silanes", Tetrahedron Letters, Jan. 26, 2001 (Jan. 26, 2001) vol. 42, pp. 763-766, Title, p. 764.
Becker et al. "Zinc silanethiolates: synthesis and properties, Crystal structures of bis(tri-tert-butoxysilanethiolato)(acetonitrile)zinc(II) and bis(tri-tert-butoxysilanthiolato)(biprydine)(zinc(II)", Journal of Organometallic Chemistry, Aug. 23, 1996 (Aug. 23, 1996), vol. 521, pp. 39-49; p. 40.
Li et al. "Catalytic Reduction of Calcium Sulfate to Calcium Sulfide by Carbon Monoxide", Industrial & Engineering Chemistry Research, Aug. 3, 1999 (Aug. 3, 1999), vol. 38, pp. 3333-3337, Title.
Cotton et al. "Liquid hydrogen sulphide as an ionising solvent. Part III. Reactions of compounds of Groups IV, V, and VI", Journal of Chemical Society A: Inorganic, Physical, Theoretical, Jan. 1, 1966 (Jan. 1, 1966), vol. 0, pp. 793-797; entire document.
Beckers et al. "F3SiSH and (F3Si)2S: Conflicting Observations Resolved by Unambiguous Synthesis", Journal of Inorganic and General Chemistry, May 25, 2001 (May 25, 2001), vol. 627, pp. 1217-1224; entire document.
International Search Report and Written Opinion of the International Searching Authority dated Mar. 22, 2019 in corresponding International Patent Application No. PCT/2018/059811.

* cited by examiner

*Primary Examiner* — Pancham Bakshi
(74) *Attorney, Agent, or Firm* — Honigman LLP

(57) ABSTRACT

Preparation of sulfur fine chemicals from sulfur sources is described.

7 Claims, 12 Drawing Sheets

METHOD FOR PRODUCING TRICHLOROSILYLSULFIDE ANION AND ITS USE IN THE PREPARATION OF ORGANOSULFUR COMPOUNDS

CLAIM OF PRIORITY

This application is a National Phase application filed under 35 USC § 371 of International Application No. PCT/US2018/059811, filed on Nov. 8, 2018, which claims the benefit of prior filed U.S. Provisional Application No. 62/697,037, filed Jul. 12, 2018, each of which is incorporated by reference in its entirety.

TECHNICAL FIELD

The invention relates to methods of producing sulfur chemicals.

BACKGROUND

Carbon-sulfur bond-containing compounds are essential for life, being found in amino acids such as cysteine and drugs such as penicillin. Carbon-sulfur bonds provide excellent synthetic handles, and find several uses in synthetic organic chemistry. Thiols themselves can be used as capping ligands for nanoparticles. See, for example, D. Voet, J. G. Voet, Biochemistry (John Wiley & Sons, Hoboken, N.J., 2011), fourth edn. OCLC: ocn690489261, J. C. Sheehan, K. R. Henery-Logan, J. Am. Chem. Soc. 81, 3089 (1959), P. Metzner, Organosulfur Chemistry I, Top. Curr. Chem. (Springer, Berlin, Heidelberg, 1999), pp. 127-181, and A. Kassam, G. Bremner, B. Clark, G. Ulibarri, R. B. Lennox, J. Am. Chem. Soc. 128, 3476 (2006), each of which is incorporated by reference in its entirety.

Sulfide-containing materials are important for many technological applications. For example, molybdenum disulfide is used as a dry lubricant at high temperatures and has recently been shown to be an effective catalyst for the hydrogen evolution reaction. See, D. F. Shriver, P. W. Atkins, S. H. Strauss, Inorganic chemistry (Oxford University Press, Oxford, 2010), fifth edn. and A. B. Laursen, S. Kegns, S. Dahl, I. Chorkendorff, Energy Environ. Sci. 5, 5577 (2012), each of which is incorporated by reference in its entirety.

SUMMARY

A method for the preparation of the trichlorosilylsulfide anion and its subsequent application in synthesis of organosulfur compounds and sulfide-containing materials is described herein.

In one aspect, a method of manufacturing a silyl sulfide can include contacting a sulfate-source with a silane reducing agent to produce the silyl sulfide.

In certain circumstances, the sulfate-source can be a bisulfate.

In certain circumstances, the bisulfate can be a bisulfate salt or is a bisulfate produced in situ from a sulfate salt and an acid or sulfuric acid and a base.

In certain circumstances, the silyl sulfide can be a salt including the silyl sulfide is an anion and a cation.

In certain circumstances, the silane reducing agent can be $H_nSiX_{4-n}$ where X is a halogen, a pseudohalogen, alkoxy, aryloxy, amido or arylamido and n is 1, 2, 3 or 4.

In certain circumstances, the silyl sulfide can be $[X_3SiS]^-$ wherein X is a halogen, a pseudohalogen, alkoxy, aryloxy, amido or arylamido.

In certain circumstances, the cation can include a nitrogen-based cation, a phosphorus-based cation, an alkali metal cation, an alkali-earth metal cation, or an ionic liquid cation.

In another aspect, a method of creating a carbon-sulfur bond can include contacting a silyl sulfide with a compound having a carbon-halide or a carbon-oxygen bond.

In certain circumstances, the silyl sulfide can include $[X_3SiS]^-$ wherein X is a halogen, a pseudohalogen, alkoxy, aryloxy, amido or arylamido.

In certain circumstances, the carbon-halide bond can be a carbon-bromine, carbon-chlorine or carbon-pseudohalogen bond.

In certain circumstances, the carbon-oxygen bond can be a carbon-alkoxy bond, carbon-siloxy bond or carbon-oxygen double bond.

In another aspect, a compound can include a (silyl)sulfide anion and a cation, wherein silyl sulfide anion includes $[X_3SiS]^-$ wherein X is a halogen, a pseudohalogen, alkoxy, aryloxy, amido or arylamido and the cation is a nitrogen-based cation, a phosphorus-based cation, an alkali metal cation, an alkali-earth metal cation, or an ionic liquid cation.

In certain circumstances, the cation is $[R_4N]^+$, where R is nBu, sBu, iBu, nPr, iPr, Et, or Me. For example, the cation can include $[R_4N]^+$, where R is nBu.

In certain circumstances, the cation can be tetraalkylammonium, an imidazolium, a phosphonium, PPN, or TAS.

In certain circumstances, the silyl can be $H_nSiX_{3-n}$ where X is a halogen, alkoxy, aryloxy, amido or arylamido and n is 0, 1, 2 or 3.

In certain circumstances, the silyl can be $SiX_3$ where X is a halogen.

In certain circumstances, the cation can be $[R_4N]^+$, where R is nBu and the silyl is $SiX_3$ where X is chloro. In other examples, the silyl can be $SiX_3$ where X is fluoro.

In another aspect, a method of preparing a sulfide can include contacting a (silyl)sulfide with a metal salt.

In certain circumstances, the metal salt can be a transition metal or heavy metal halide. For example, the halide can be F, Cl, Br, I or a pseudohalide.

In certain circumstances, the pseudohalide (an anion of a pseudohalogent) can be triflate, tosylate, mesylate, acetate, acetylacetonate or carboxylate.

In another aspect, a method of preparing a fluoride can include contacting a (fluorosilyl)sulfide salt with an electrophile.

Other aspects, embodiments, and features will be apparent from the following description, the drawings, and the claims.

DETAILED DESCRIPTION

Figure 1:
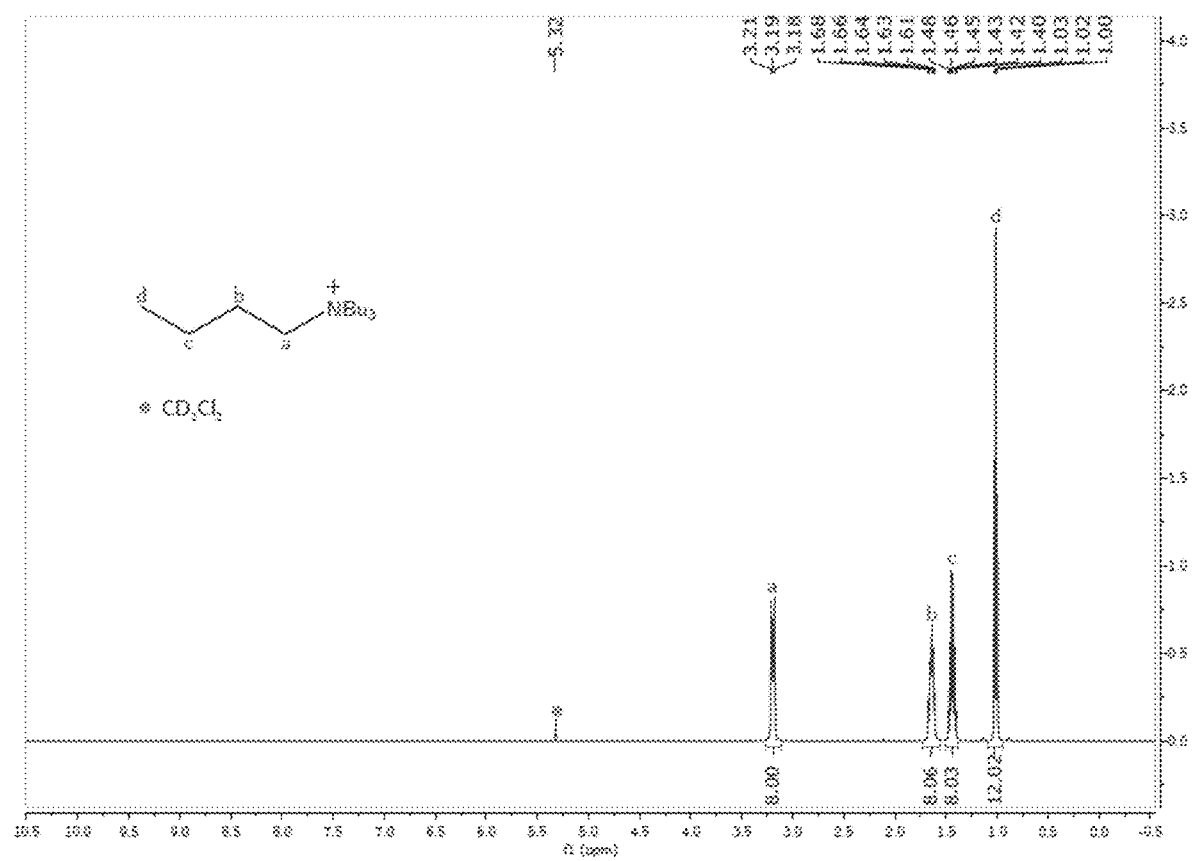
FIG. 1 is a $^1H$ NMR spectrum of [TBA][SSiCl$_3$] in CD$_2$Cl$_2$ at 25° C., recorded at 500 MHz.
Figure 2:
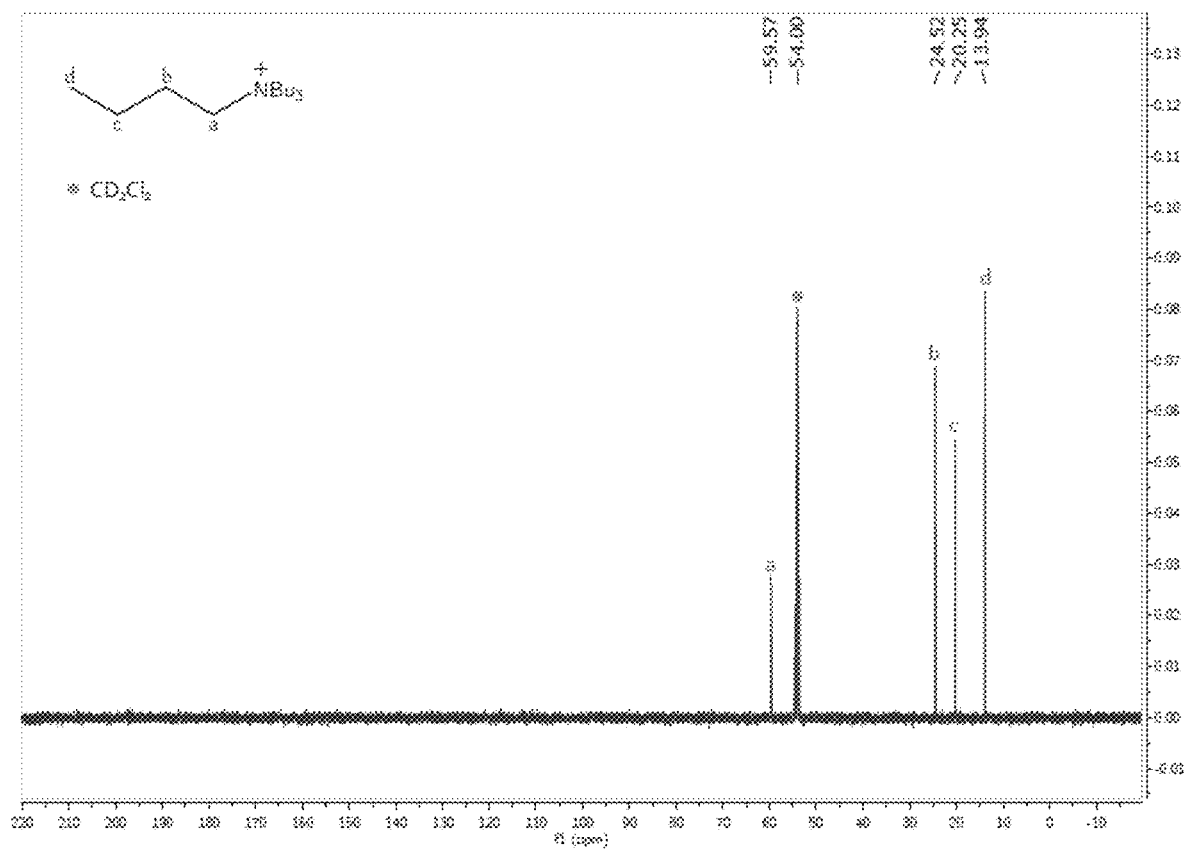
FIG. 2 is a $^{13}C$ NMR spectrum of [TBA][SSiCl$_3$] in CD$_2$Cl$_2$ at 25° C., recorded at 126 MHz.
Figure 3:
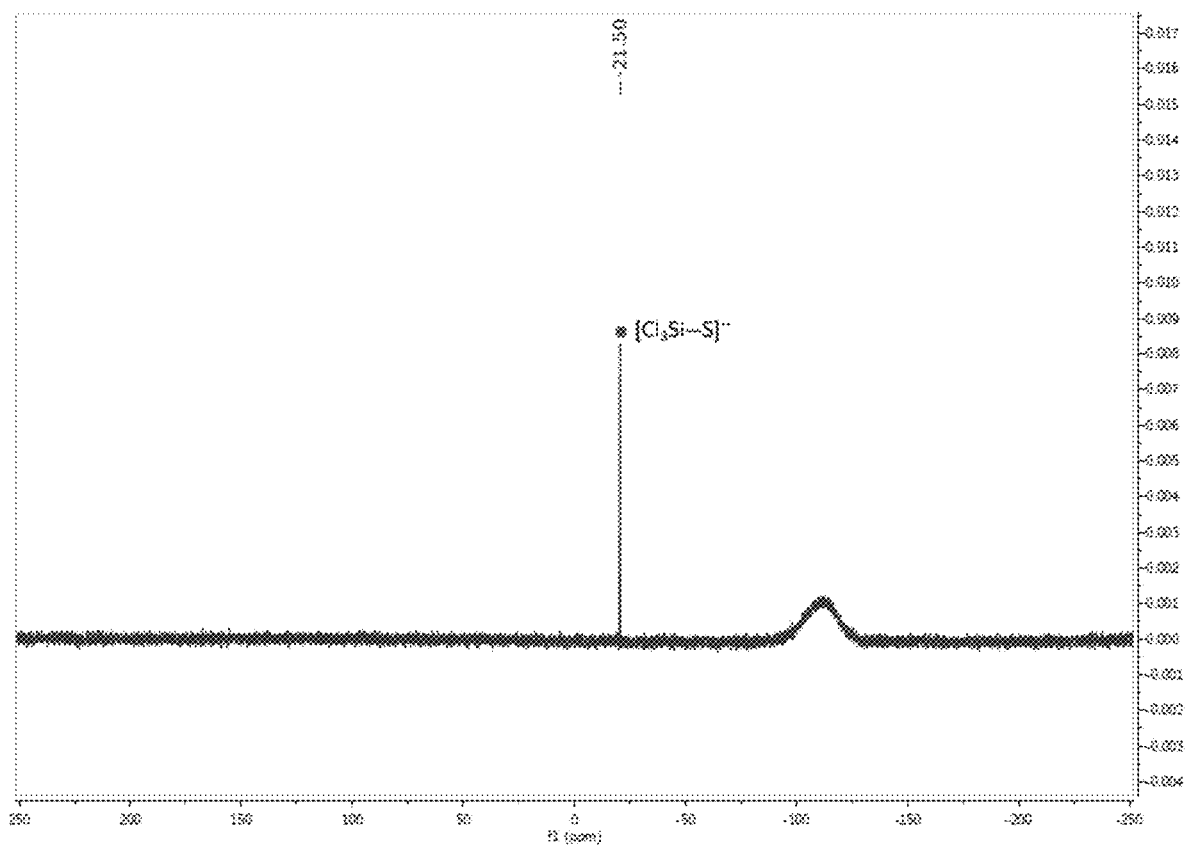
FIG. 3 is a $^{29}Si$ NMR spectrum of [TBA][SSiCl$_3$] in CD$_2$Cl$_2$ at 25° C., recorded at 99 MHz.
Figure 4:
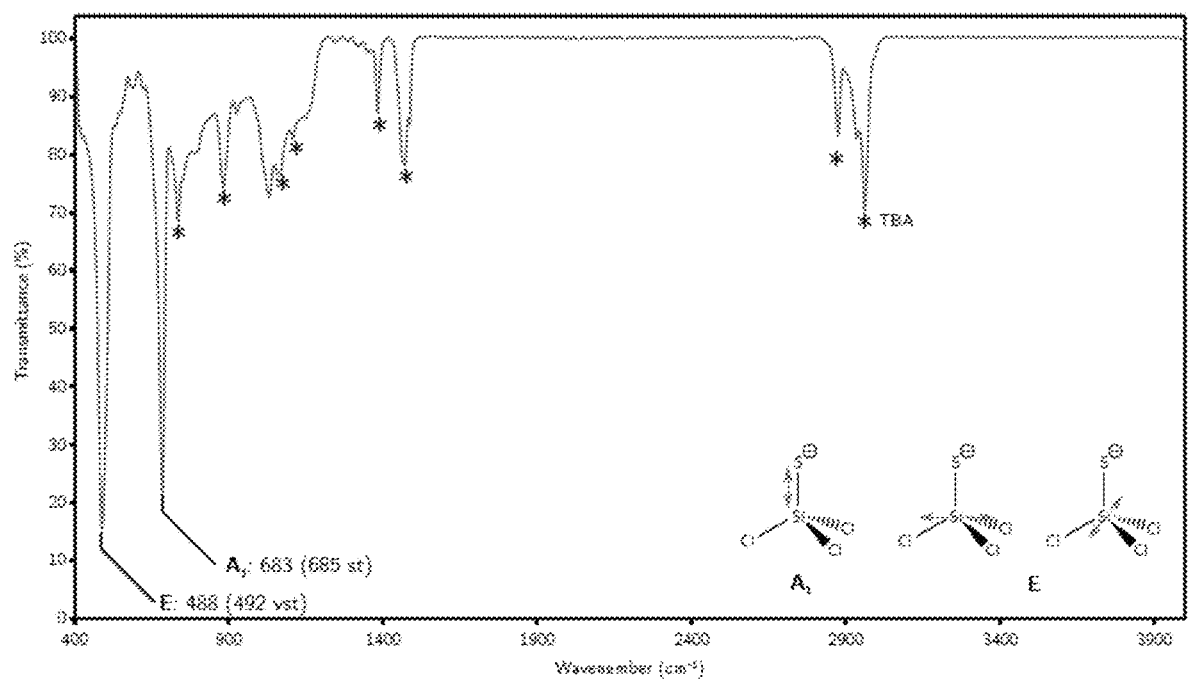
FIG. 4 is an IR spectrum of [TBA][SSiCl$_3$]. The numbers in parentheses are of the previously reported values (15). st=strong vst=very strong.
Figure 5:
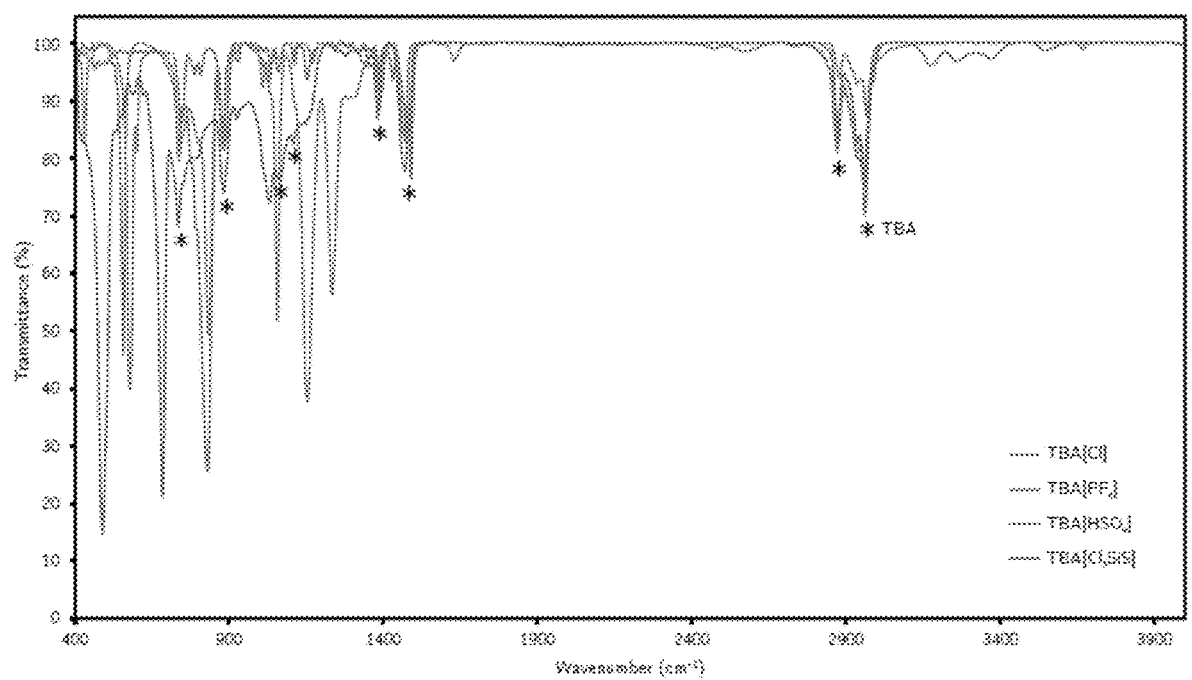
FIG. 5 is an overlay of the IR spectra of [TBA][SSiCl$_3$], [TBA][HSO$_4$], [TBA][Cl], and [TBA][PF$_6$]. This shows there is no remaining bisulfate in [TBA][Cl$_3$SiS]$^-$. The spectra of [TBA][Cl] and [TBA][PF$_6$] were collected in order to assign the peaks arising from the tetrabutylammonium cation.
Figure 6:
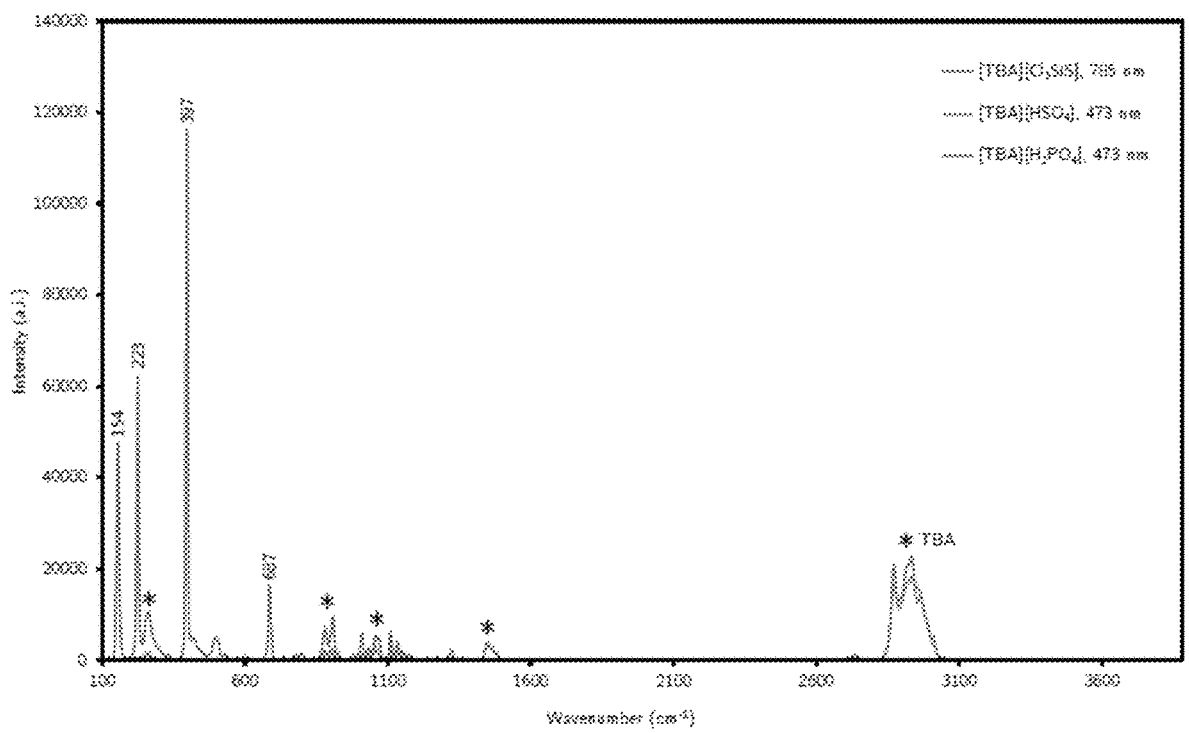
FIG. 6 is an overlay of the Raman spectra of [TBA][SSiCl$_3$], [TBA][HSO$_4$], and [TBA][H$_2$PO$_4$]. This shows there is no remaining bisulfate in [TBA][Cl$_3$SiS]$^-$. The spectra of [TBA][HSO$_4$] and [TBA][H$_2$PO$_4$] were collected in order to assign the peaks arising from the tetrabutylammonium cation. The value in nm in the legend corresponds to the excitation wavelength.

A process for the synthesis of sulfide-containing fine chemicals can include the production of trichlorosilylsulfide anion ([Cl$_3$SiS]$^-$, [2]$^-$), from bisulfate, [HSO$_4$]$^-$. [2]$^-$ can be used to prepare organosulfur compounds from C—Br and C—O bond-containing substrates.

Methods for Preparing Alkylthiols and for Thionation Reactions

The three major methods for preparing alkylthiols are (i) treatment of an alkyl halide with thiourea, (ii) treatment of an olefin with hydrogen sulfide or (iii) treatment of an alkyl halide with a sulfide source, such as sodium hydrosulfide (NaSH). See, B. C. Cossar, J. O. Fournier, D. L. Fields, D. D. Reynolds, *J. Org. Chem.* 27, 93 (1962), C. Muller, M. Weber, E. Stroefer, V. Wloka, J. Faderl, *Preparation of thiols* (2006), and J. L. Wardell, *The Thiol Group* (1974) (Wiley-Blackwell, 1974), vol. 1, pp. 163-269, each of which is incorporated by reference in its entirety. One drawback of all three of these methods is that hydrogen sulfide is a requirement, either directly or in the synthesis of the precursors. See, B. Mertschenk, A. Knott, W. Bauer, "*Thiourea and Thiourea Derivatives*", *Ullmann's Encyclopedia of Industrial Chemistry* (Wiley, Weinheim, Germany, 2013), pp. 1-15, which is incorporated by reference in its entirety. Hydrogen sulfide gas is both extremely toxic and dangerous; it has a boiling point of −60° C. and if it is used as a liquid, there is a risk of explosion if it warms above this temperature when the apparatus used to handle it is not kept sufficiently cold. See, N. N. Greenwood, A. Earnshaw, *Chemistry of the elements* (Butterworth-Heinemann, Boston, Mass., 1997), second edn., which is incorporated by reference in its entirety. Additionally, the latter two methods suffer from further drawbacks: (i) hydrogen sulfide can add to either side of the olefin to give a mixture of regioisomers and (ii) sodium hydrosulfide can lead to the formation of alkenes via an E2 reaction from the alkyl halide.

The two most commonly utilized reagents for the conversion of carbonyl groups to the corresponding thiocarbonyl groups (thionation reactions) are phosphorus pentasulfide and Lawesson's reagent (LR). See, M. Jesberger, T. P. Davis, L. Barner, *Synthesis* 2003, 1929 (2003), which is incorporated by reference in its entirety. One drawback of using phosphorus pentasulfide is that it often requires forcing conditions such as high temperature and generally results in lower yields compared to LR. See, T. Ozturk, E. Ertas, O. Mert, *Chem. Rev.* 107, 5210 (2007), which is incorporated by reference in its entirety. LR, which is the thionation reagent of choice for many reactions, also suffers from drawbacks such as high cost, and problematic separation of neutral byproducts which typically requires column chromatography. See, T. J. Curphey, *J. Org. Chem.* 67, 6461 (2002), which is incorporated by reference in its entirety.

Method for Preparing the Trichlorosilylsulfide Anion

The trichlorosilylsulfide anion, [Cl$_3$SiS], was previously prepared as the tetraethylammonium salt by treating tetraethylammonium hydrogen sulfide with silicon tetrachloride in liquid hydrogen sulfide (H$_2$S). See, U. Muller, V. Krug, Z. Naturforsch., B: *J. Chem. Sci.* 40 (1985), which is incorporated by reference in its entirety. The reactivity of this anion toward carbon-based electrophiles has not been described.

Trichlorosilanethiol (Cl$_3$SiSH) has been described previously, and is prepared by the high temperature reaction between silicon tetrachloride and hydrogen sulfide gas. See, D. J. Panckhurst, C. J. Wilkins, A. T. Brault, R. J. Angelici, *Inorg. Synth.*, J. Kleinberg, ed. (John Wiley & Sons, Inc., Hoboken, N.J., USA, 1963), vol. 7, pp. 28-30, which is incorporated by reference in its entirety. However, it has neither been deprotonated to give a stable salt of the conjugate base ([Cl$_3$SiS]$^-$), nor used for the preparation of sulfur-carbon bonds.

A survey of the literature returned the trichlorosilylsulfide anion ([Cl$_3$SiS]$^-$, [2]$^-$), which was previously prepared from tetraethylammonium hydrogen sulfide with silicon tetrachloride in liquid hydrogen sulfide. The same anion might be accessed by reduction of bisulfate with trichlorosilane: a procedure that would avoid the use of liquefied H$_2$S, which is both extremely toxic and dangerous. [TBA][2] could be prepared in moderate yield (43%) from [TBA][HSO$_4$] in an acetonitrile/trichlorosilane mixture at 23° C. It was also found that reduction of [TBA][HSO$_4$] with trichlorosilane leads to the formation of some elemental sulfur. A single crystal obtained from the crude reaction mixture in the preparation of [TBA][2] was unambiguously defined as S$_8$ by comparison of its unit cell with previous literature reports.

Preparation of the Trichlorosilylsulfide Anion

A new method is described for the preparation of the trichlorosilylsulfide anion, a method embodied by treating a source of bisulfate, [HSO$_4$]$^-$, with trichlorosilane. An organic solvent can be used for the reaction, preferably acetonitrile. In one example, tetrabutylammonium bisulfate was used to obtain the tetrabutylammonium salt of the trichlorosilylsulfide anion in a trichlorosilane/acetonitrile mixture:

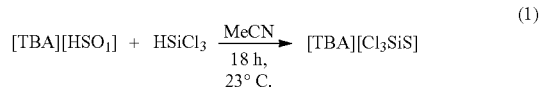

(1)

The salt was readily identified by silicon-29 nuclear magnetic resonance (NMR) spectroscopy, infrared (IR) spectroscopy, Raman spectroscopy and also was structurally characterized by X-ray crystallography.

An advantage of this method for preparing the trichlorosilylsulfide anion is that the reaction proceeds easily at 23° C. (i.e., ambient temperature), whereas the previous method required careful control of the temperature. See, U. Muller, V. Krug, Z. Naturforsch., B: *J. Chem. Sci.* 40 (1985), which is incorporated by reference in its entirety. An additional advantage of this method is that it does not require the use of liquid hydrogen sulfide, which is both extremely toxic and dangerous. See, N. N. Greenwood, A. Earnshaw, *Chemistry of the elements* (Butterworth-Heinemann, Boston, Mass., 1997), second edn., which is incorporated by reference in its entirety. A further advantage of this method is that it uses trichlorosilane as the reducing agent, which is inexpensive and a High Production Volume (HPV) chemical. See, Data accessed from Chemical Data Access Tool (CDAT) on September 2017, which is incorporated by reference in its entirety.

Sulfur-Carbon Bond Forming Reactions

Alkyl(Trichlorosilyl)Sulfides and Conversion to Alkylthiols

An alkyl (pseudo)halide can be converted to an alkyl (trichlorosilyl)sulfide ($RSSiCl_3$) by treatment with [TBA][$Cl_3SiS$]. The alkyl(trichlorosilyl)sulfide can be converted to the corresponding alkylthiol (RSH) by treatment with a proton source. In one case, the alkyl (pseudo)halide was benzyl bromide and the proton source was water to give benzyl mercaptan as the product. A general equation for the preparation of alkyl(trichlorosilyl)sulfides and subsequent conversion to an alkylthiol is provided in Eqn. 2:

  (2)

where [A]$^+$ represents an organic cation such as a tetraalkylammonium, a trialkylammonium, dialkylammonium, alkylammonium, imidazolium, phosphonium, PPN, or TAS. R is an alkyl group and HX acts as a source of proton. One specific example of this reaction scheme is:

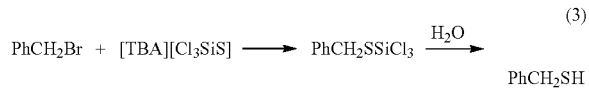  (3)

Conversion of Carbonyl Groups to the Corresponding Thiocarbonyl Compounds

The trichlorosilylsulfide anion can be used to convert carbonyl functional groups to the thiocarbonyl-containing analogues. Suitable carbonyl-containing compounds are ketones, aldehydes, amides, lactones, quinones, lactams, esters, imides, nucleosides and peptides. Other classes of compounds that can undergo analogous reactions are the conversion of phosphine oxides to phosphine sulfides.

  (4)

where $R^1$ and $R^2$ include alkyl, alkoxy, dialkylamino, substituted aryl, hydrogen and cyclic derivatives thereof. [A]$^+$ represents an organic cation such as a tetraalkylammonium, a trialkylammonium, dialkylammonium, alkylammonium, imidazolium, phosphonium, bis(triphenylphosphine) iminium (PPN), or tris(dimethylamino)sulfonium (TAS).

In one example, the carbonyl-containing compound was benzophenone, which was converted to thiobenzophenone using [TBA][$Cl_3SiS$]:

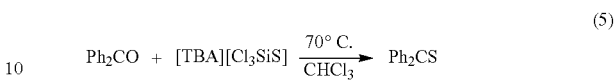  (5)

An advantage of this procedure is that the neutral product can be separated easily from the ionic byproducts (i.e., tetrabutylammonium salts) by extraction with a non-polar organic solvent such as pentane. This procedure allows for the isolation of spectroscopically pure thiobenzophenone without the requirement for purification using column chromatography, as is frequently encountered when alternative thionation reagents such as LR are employed. See, T. J. Curphey, *J. Org. Chem.* 67, 6461 (2002), which is incorporated by reference in its entirety.

Commercial Applications

The improved method for the preparation of organic cation salts of [$Cl_3SiS$]$^-$ can immediately be implemented to avoid the use of toxic and dangerous liquid hydrogen sulfide. [TBA][$Cl_3SiS$] can immediately be used for the preparation of benzyl mercaptan and for the conversion of benzophenone to thiobenzophenone.

Method for the Preparation of Various Salts of [$Cl_3SiS$]$^-$

A novel method for the preparing novel organic cation salts of [$Cl_3SiS$]$^-$ could involve treating trichlorosilanethiol (prepared according to either section 5.4 or a literature procedure (16)) with an appropriate organic base, such as a trialkylamine, to give the trialkylammonium salt of [$Cl_3SiS$]$^-$. An example reaction is shown below:

  (6)

An additional method for the preparation of organic-cation salts of [$Cl_3SiS$]$^-$ could include treatment of an organic-cation salt of bisulfate with trichlorosilane:

  (7)

where [A]$^+$ is an organic cation such as a tetraalkylammonium, an imidazolium, a phosphonium, PPN, or TAS.

An additional route to organic cation salts of trichlorosilylsulfide could involve in situ generation of the bisulfate salt, using sulfuric acid and a (pseudo)halide salt of the organic cation:

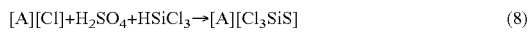  (8)

where [A]$^+$ is an organic cation such as a tetraalkylammonium, an imidazolium, a phosphonium, PPN, or TAS. An advantage of this method is that sulfuric acid is a cheap and readily available source of sulfate. Additionally, the organic cation salt of bisulfate would not need to be prepared.

Method for Forming Carbon-Sulfur Bonds without Isolation of Silylsulfide

An additional application of the improved method for the preparation of the trichlorosilylsulfide anion is that it may be used to prepare carbon-sulfur bonds without isolation and purification of a trichlorosilylsulfide-containing salt. Instead, it is generated in situ by treating the appropriate bisulfate salt with trichlorosilane in the presence of a suitable substrate:

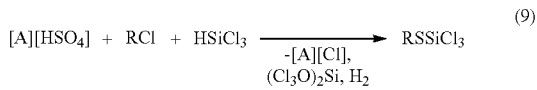

(9)

where [A]⁺ is an organic cation such as a tetraalkylammonium, an imidazolium, a phosphonium, PPN, or TAS.

Method for Preparing Element Sulfide Materials from the Silylsulfide Anion

An additional application of the trichlorosilylsulfide anion could be for the preparation of sulfide-containing materials. In such a scheme, the appropriate element (pseudo)halide is treated with an organic-cation salt of trichlorosilylsulfide to give formation of the element sulfide. An general example of this reaction is given below:

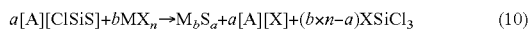

(10)

where 2a=bn. M can be a transition-metal element, or alternatively a p-block or s-block element. X can be a halide (F, Cl, Br, I) or pseudohalide (for example, triflate, tosylate, mesylate, acetate, acetylacetonate or a carboxylate). Examples of some of the substrates that can be used in this reaction are cadmium(II) chloride, molybdenum(IV) chloride and magnesium(II) acetylacetonate which furnish cadmium(II) sulfide, molybdenum(IV) sulfide, and magnesium (II) sulfide, respectively.

Method for Preparing Trichlorosilanethiol from Trichlorosilylsulfide and Applications Thereof An additional application of the trichlorosilylsulfide anion could be for the preparation of trichlorosilanethiol, $C_3SiSH$. In such a scheme, an organic-cation salt of trichlorosilylsulfide is treated with an acid, according to:

(11)

where HX is an acid such as trifluoromethanesulfonic acid, acetic acid or hydrochloric acid. Trichlorosilanethiol would then be purified away from salt byproducts ([A][X]) by distillation. This method would constitute and improvement on the current synthesis of trichlorosilanethiol because it would avoid the use of toxic and dangerous hydrogen sulfide, and does not require the use of high-temperature (900-950° C.) synthesis.

The potential applications of trichlorosilanethiol for the preparation of sulfide-containing materials would proceed along the lines of that described for the conjugate anion:

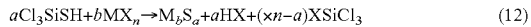

(12)

where M and X have the same definitions as for Eqn 10.

Method for Preparing the Trifluorosilylsulfide Anion and Subsequent Use in Fluorination Treatment of an organic cation salt of trichlorosilylsulfide with a source of fluoride such tetramethylammonium fluoride (TMAF) could result in formation of the trifluorosilylsulfide anion

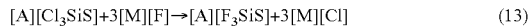

(13)

where [A]⁺ is an organic cation such as a tetraalkylammonium, an imidazolium, a phosphonium, PPN, or TAS. [M]⁺ is an organic cation such as [A]⁺, or a an alkali metal.

This anion could be competent for fluorination of epoxides, along the lines of the following reaction:

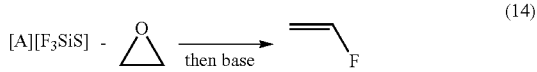

(14)

An analogous reaction is known for silicon tetrafluoride. See, M. Shimizu, H. Yoshioka, *Tetrahedron Lett.* 30, 967 (1989), which is incorporated by reference in its entirety. An advantage of the proposed is that [A][F₃SiS] would be a non-volatile salt, and therefore present a lower safety risk than silicon(IV) fluoride, which releases toxic hydrogen fluoride gas upon contact with moist air. See, N. N. Greenwood, A. Earnshaw, *Chemistry of the elements* (Butterworth-Heinemann, Boston, Mass., 1997), second edn., which is incorporated by reference in its entirety. Fluorination of substrates has become an increasingly important topic in recent years because of the ability to label drugs with an $^{18}F$ radioisotope. See, K. L. Kirk, *Org. Process Res. Dev.* 12, 305 (2008), which is incorporated by reference in its entirety.

Scope of the Silane Starting Material

Additional scope is envisioned in the silane starting material. Suitable silanes have the composition $H_nSiR_{4-n}$, where n=1-4 and R is a halide, alkyl group, alkoxy group, aryloxy group, dialkylamino group or pseudohalide such as triflate or mesylate. The use of these silanes in conjunction with an organic-cation salt of bisulfate could give rise to the organic-cation salt of $[R_3SiS]^-$. The potential applications of these possible anions are the same as have been described for the trichlorosilylsulfide anion.

List of Abbreviations Used

MeCN acetonitrile

NMR nuclear magnetic resonance

PBTC 2-phosphonobutane-1,2,4-tricarboxylic acid

PPN bis(triphenylphosphoranylidene)ammonium

TAS tris(dimethylamino)sulfonium

TBA tetrabutylammonium

THF tetrahydrofuran

Experimental Details

General Procedures

All manipulations were performed in a Vacuum Atmospheres model MO-40M glovebox under an inert atmosphere of purified $N_2$ or using standard Schlenk techniques. When reagents were removed from a stock bottle containing a Sure/Seal, the equivalent volume of dry nitrogen was injected into the bottle prior to removing the desired volume of solution with a syringe. All solvents were obtained anhydrous and oxygen-free by bubble degassing (argon) and purification by passing through columns of alumina and Q5. Once collected, solvents were stored over activated 4A molecular sieves (20 wt %) inside the glovebox. All glassware was oven-dried for at least 6 h prior to use, at temperatures greater than 150° C.

Trichlorosilane (Millipore-Sigma) were used as received. Tetrabutylammonium dihydrogen phosphate (Alfa Aesar), tetrabutylammonium chloride (Millipore-Sigma), tetrabutylammoniumhydrogen sulfate (Acros) and phosphoric acid (crystalline, Millipore-Sigma) were dried at 23° C. in vacuo for 12 hours prior to use. (4-chlorobutyl)benzene (TCI) was degassed three times by the freeze-pump-thaw method and stored over activated 4A molecular sieves for 48 h prior to use. Dichloromethane-d₂, benzene-d₆, acetonitrile-d₃ and chloroform-d were purchased from Cambridge Isotope Labs and were degassed three times by the freeze-pump-thaw method and stored over activated 4A molecular sieves for 48 h in the glovebox prior to use. Diatomaceous earth (Celite 435, EM Science), 4A molecular sieves (Millipore-Sigma) and basic alumina (Millipore-Sigma) were dried by heating to 200° C. under dynamic vacuum for at least 48 h prior to use. The temperature of the aluminum shot used to heat reagents or reaction mixtures was measured using a Hanna Instruments K-type Thermocouple Thermometer (model HI935005).

NMR spectra were obtained on Varian Inova 300 and 500 instruments equipped with Oxford Instruments superconducting magnets, on a Jeol ECZ-500 instrument equipped with an Oxford Instruments superconducting magnet, or on a Bruker Avance 400 instrument equipped with a Magnex Scientific or with a SpectroSpin superconducting magnet. $^1$H and $^{13}$C NMR spectra were referenced to residual dichloromethane-d$_2$ ($^1$H=5.32 ppm, $^{13}$C=54.0 ppm), benzene-d$_6$ ($^1$H=7.16 ppm, $^{13}$C=128.06 ppm), acetonitrile-d$_3$ ($^1$H=1.94 ppm, $^{13}$C=118.26 ppm) or chloroform-d ($^1$H=7.26 ppm, $^{13}$C=77.16 ppm). $^{31}$P NMR spectra were referenced externally to 85% H$_3$PO$_4$ (0 ppm). $^{19}$F NMR spectra were referenced externally to hexafluorobenzene in benzene-d$_6$ (0.2 M, −164.9 ppm).

Electrospray ionization mass spectrometry (ESI-MS) was performed using a Micromass Q-TOF ESI spectrometer.

Raman spectra were collected using a Renishaw Invia Reflex Micro Raman.

IR spectra were collected using a Bruker Tensor 37 ATR IR spectrometer. Solid samples were loaded onto the plate in air and spectra collected quickly.

Elemental combustion analyses were performed by Robertson Microlit Laboratories (Ledgewood, N.J., USA).

Preparation of [TBA][SSiCl$_3$]

In a glovebox, [TBA][HSO$_4$] (1.0 g, 2.94 mmol) was weighed into a thick-walled 100 mL Schlenk flask. The material was dissolved in acetonitrile (5 mL). The flask was sealed and cycled onto a Schlenk line. Against a positive pressure of nitrogen, trichlorosilane (6 mL, 59.5 mmol) was added using a syringe. The solution was stirred vigorously at 23° C. for 20 h, then volatile material removed in vacuo for a total of 2 h. The flask was brought into the glovebox and the material slurried in THF (20 mL) then stirred for five minutes. The mixture was passed through a frit (15 mL, fine porosity) containing diatomaceous earth (2 cm bed). The diatomaceous earth was washed with THF (3×7 mL). Volatile material was removed from the filtrate in vacuo to give a sticky white oil. The oil was triturated with diethyl ether (3×7 mL) to give a yellow solid. The material was dissolved in DCM (3 mL), then passed through a piece of filter paper in a pipette into a vial (20 mL). The flask was washed with DCM (1 mL) and the washings passed through the filter paper into the vial. Diethyl ether was added to the vial to produce a white precipitate and the resulting solution was stored in the freezer (−35° C.) overnight. The solids were collected on a frit (fine porosity, 15 mL) and washed with diethyl ether (−35° C., 3×7 mL). The material obtained was dissolved in 10 mL DCM, and the undissolved material was removed by passing through a piece of filter paper in a pipette, that contained approximately 1 cm of diatomaceous earth. If the filter got blocked, a new pipette with filter paper and 1 cm of diatomaceous earth was used. The solution was concentrated to 3 mL and diethyl ether (17 mL) was added to produce a white precipitate. The mixture was stored in the glovebox freezer overnight. The solids were collected on a frit (fine porosity, 15 mL) and washed with diethyl ether (−35° C., 3×7 mL) then transferred to a vial and dried to constant mass (520 mg, 1.27 mmol, 43% yield). This material was recrystallized for elemental analysis. Elem. Anal. Calcd(found) for $C_{16}H_{36}Cl_3N_1S_1Si_1$: C, 46.99 (47.08), H, 8.87 (9.02), N, 3.42 (3.44). $^1$H NMR (500 MHz, CD$_2$Cl$_2$, δ) 3.27-3.11 (m, 8H), 1.64 (p, J=7.9 Hz, 8H), 1.44 (h, J=7.3 Hz, 8H), 1.02 (t, J=7.3 Hz, 12H). $^{13}$C NMR (126 MHz, CD$_2$Cl$_2$, δ) 59.57, 24.52, 20.25, 13.94. $^{29}$Si NMR (99 MHz, CD$_2$Cl$_2$, δ) −21.50. See, FIGS. 1-6.

Preparation of Benzyl Mercaptan

In the glovebox, [TBA][Cl$_3$SiS]$^-$ (658 mg, 1.61 mmol) was weighed into a 25 mL Schlenk flask. Benzyl bromide (180 mg, 1.05 mmol) was weighed into a vial (20 mL) and transferred to the Schlenk flask using DCM (3 mL, 1 mL, 1 mL). The flask was sealed and heated to 40° C. for 18 h. After this time, water (150 μL, degassed by sparging with N$_2$ for 20 minutes) was added to the reaction mixture. Once hydrolysis was complete, the reaction mixture was passed through a silica plug in a fine porosity frit (15 mL, ⅔ full of silica) in the fume hood. DCM (100 mL) was used to wash the plug into an Erlenmeyer flask. The filtrate was concentrated to ca. 5 mL and transferred to an H-cell. The Erlenmeyer flask was rinsed with additional DCM (2×3 mL) which was transferred to the H-cell. DCM was removed from the solution and the resulting oil was purified by trap-to-trap distillation. The side of the cell containing the crude oil was heated to 70° C. in an oil bath while the collection side was cooled with a liquid N$_2$ bath. The cell walls were heated with a heat gun for approximately 20 minutes once transfer was observed to be complete. The cell was allowed to come to ambient temperature, then the distillate washed out into a pre-weighed vial using DCM (5×3 mL). The material was dried to constant mass, giving benzyl mercaptan as a yellow oil (72 mg, 0.58 mmol, 55% yield). $^1$H NMR (500 MHz, CDCl$_3$, δ) 7.37-7.28 (m, 5H), 3.75 (d, J=7.6 Hz, 2H), 1.76 (t, J=7.5 Hz, 1H). $^{13}$C NMR (126 MHz, CDCl$_3$, δ) 141.28, 128.82, 128.15, 127.18, 29.13. These NMR data are consistent with those in the literature. See, J. Choi, N. M. Yoon, *Synthesis* 1995, 373 (1995), which is incorporated by reference in its entirety.

In Situ Characterization of Benzyl Trichlorosilylsulfide

Figure 7:
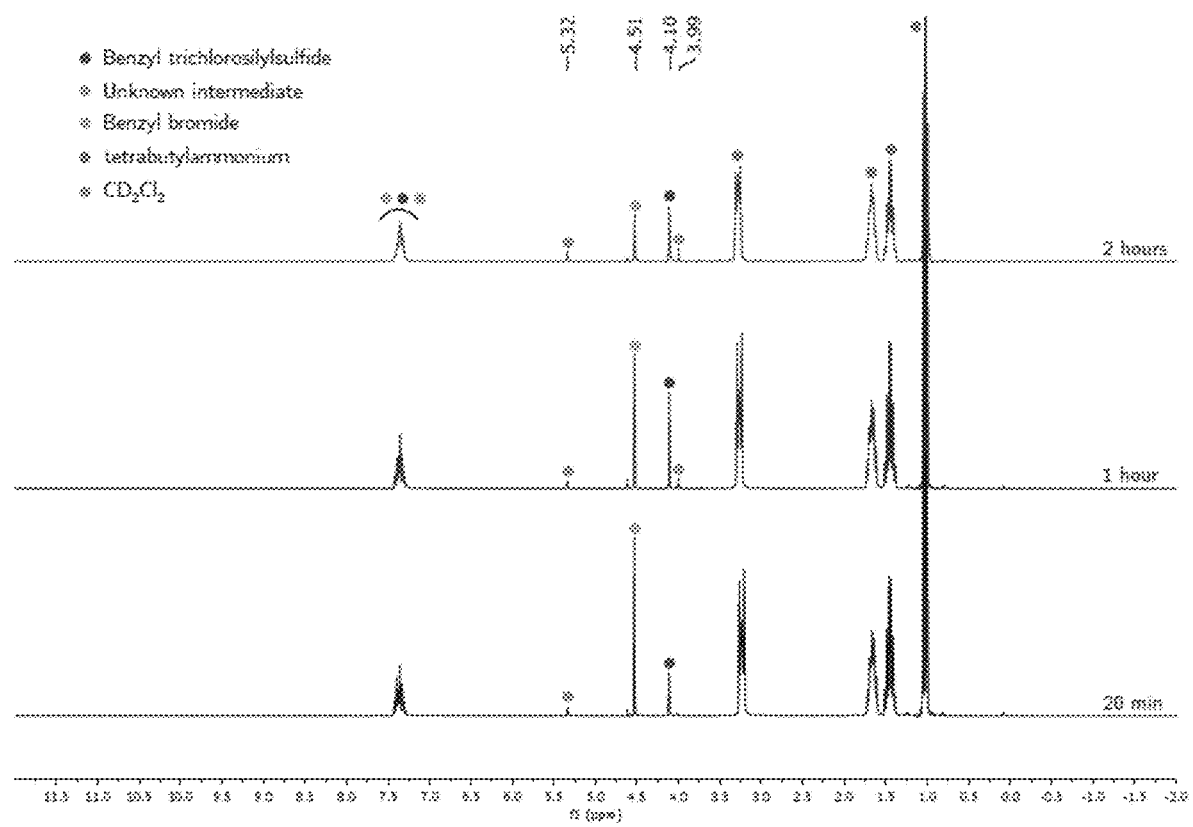
FIG. 7 is a series of $^1$H NMR spectra of the reaction of benzyl bromide with [TBA][C$_3$SiS] at three time points in CD$_2$Cl$_2$ at 25° C., recorded at 300 MHz.
Figure 8:
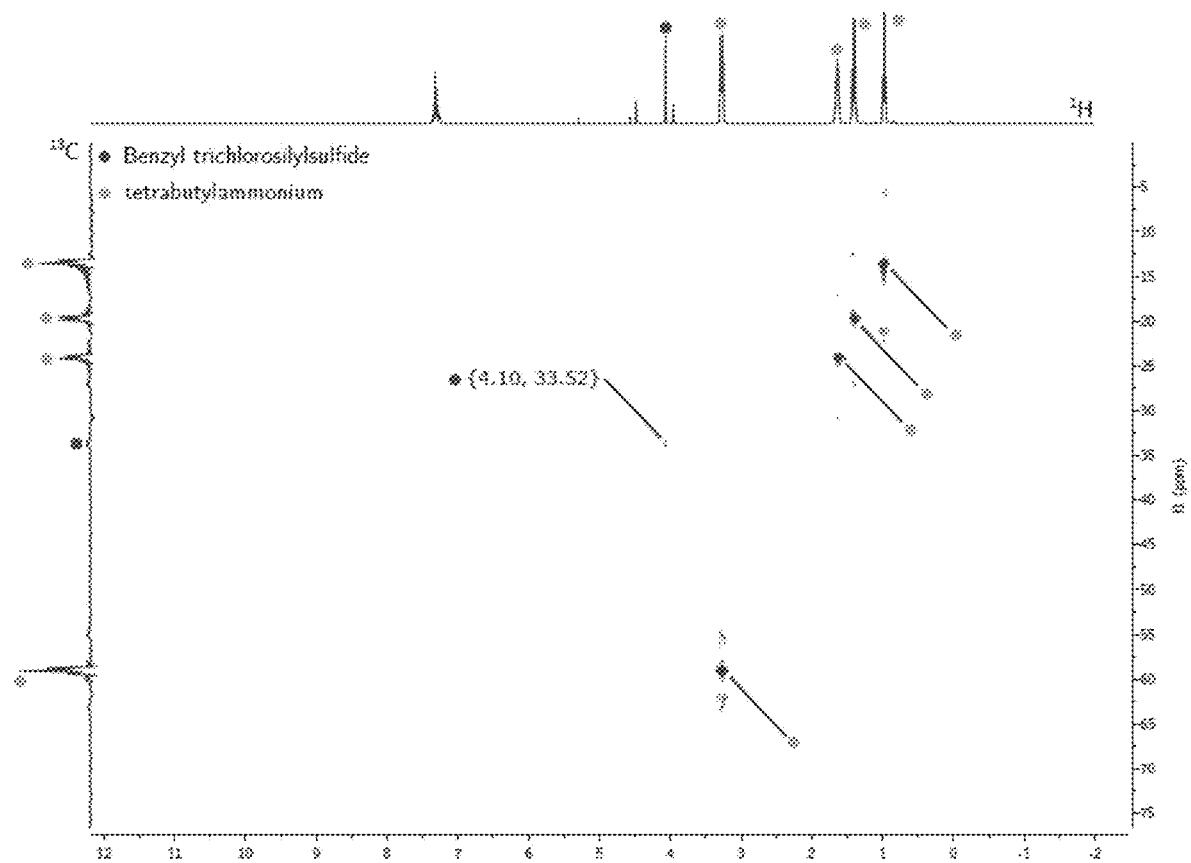
FIG. 8 is a $^1$H-$^{13}$C HSQC spectrum of the reaction of benzyl bromide with [TBA][Cl$_3$SiS] after 18 h in CD$_2$Cl$_2$ at 25° C., recorded on a 500 MHz instrument.
Figure 9:
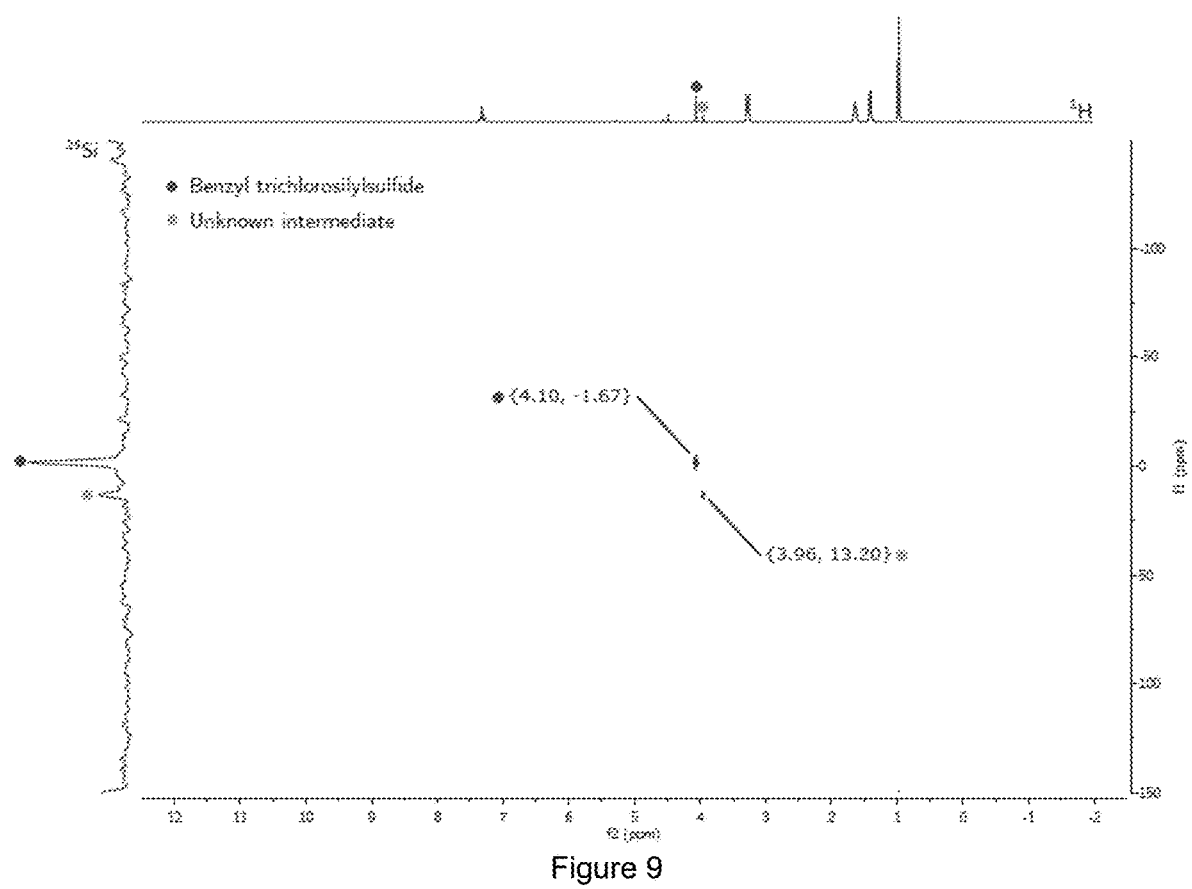
FIG. 9 is a $^1$H-$^{29}$Si HMBC spectrum of the reaction of benzyl bromide with [TBA][C$_3$SiS] after 18 h in CD$_2$Cl$_2$ at 25° C., recorded on a 500 MHz instrument.

In the glovebox, [TBA][Cl$_3$SiS] (40 mg, 0.097 mmol, 1.1 equiv) was weighed directly into an NMR tube equipped with a J. Young valve. CD$_2$Cl$_2$ (0.5 mL) was added to produce a clear colorless homogeneous solution. Benzyl bromide (10.6 μL, 0.089 mmol, 1 equiv.) was added using a micro syringe (50 μL). The NMR tube was sealed and monitored by $^1$H NMR spectroscopy at three time points; 20 minutes, 1 hour, and two hours (FIG. 7). After 18 hours, $^1$H-$^{13}$C HSQC (FIG. 8) and $^1$H-$^{29}$Si HMBC (FIG. 9) spectra were collected to identify the observed intermediates. One major new signal was assigned as benzyl trichlorosilylsulfide based on its NMR data. An additional minor species that also displayed a cross-peak in the $^1$H-$^{29}$Si HMBC was assigned as an unknown intermediate or side-product. Benzyl trichlorosilylsulfide (PhCH$_2$SSiCl$_3$): $^1$H NMR (500 MHz, CD$_2$Cl$_2$, δ) 4.10 (PhCH$_2$SSiCl$_3$). $^{13}$C NMR (126 MHz, CD$_2$Cl$_2$, δ) 33.52 (PhCH$_2$SSiCl$_3$). $^{29}$Si NMR (99 MHz, CD$_2$Cl$_2$, δ) −1.67. See, FIGS. 7-9.

Preparation of Thiobenzophenone

In a glovebox, benzophenone (61 mg, 0.335 mmol, 1 equiv.) was weighed directly into a Schlenk flask (20 mL) equipped with a J. Young valve. [TBA][Cl$_3$SiS]$^-$ (700 mg, 1.711 mmol, 5.1 equiv.) was weighed directly into the Schlenk flask. Chloroform (5 mL) was added to the flask, giving a clear colorless solution. The flask was sealed and removed from the glovebox, then heated to 80° C. for 96 h, to give a deep blue solution. The flask was brought into the glovebox and the solution was transferred to a vial (20 mL); DCM (2×2 mL) was used to rinse the flask and the resulting washings were transferred to the vial. Volatile material was removed in vacuo to give a sticky blue oil. The oil was triturated with pentane (3×6 mL). The resulting oil was extracted with pentane and broken up using a spatula until the blue color did not persist, and the solids in the vial became a fine white powder (4×8 mL). The resulting blue solution was filtered through a piece of filter paper in a Pasteur pipette into a fresh vial and the solution evaporated to constant mass to give thiobenzophenone as a crystalline blue solid (41 mg, 0.207 mmol, 62% yield). $^1$H NMR (500 MHz, CDCl$_3$, δ) 7.72 (d, J=7.5 Hz, 2H), 7.57 (d, J=7.5 Hz, 1H), 7.39 (t, J=7.7 Hz, 2H). $^{13}$C NMR (126 MHz, CDCl$_3$, δ) 238.69, 147.47, 132.17, 129.79, 128.13. These NMR data are consistent with those in the literature. See, U. Pathak, L. K. Pandey, R. Tank, J. Org. Chem. 73, 2890 (2008), which is incorporated by reference in its entirety.

X-Ray Crystallographic Studies

Diffraction-quality, colorless crystals were grown by dissolving [TBA][Cl$_3$SiS] (100 mg, 0.24 mmol) in DCM (7 mL), followed by careful layering of diethyl ether (7 mL) to produce a clear solution. The mixture was stored in the freezer at −35° C. for 168 h, producing no crystals. Pentane (3 mL) was layered carefully on top of the solution while it was still cold to produce a white precipitate. The vial was taped with electrical tape and placed back in the freezer. Overnight, large blocks grew on the bottom of the vial. These blocks were transferred into hydrocarbon oil on a microscope slide inside the glovebox. A single crystal was selected under a microscope and mounted in hydrocarbon oil on a nylon loop. Low-temperature (100 K) data were collected on a Bruker-AXS X8 Kappa Duo diffractometer coupled to a Smart Apex2 CCD detector with Mo Kα radiation (λ=0.71073 A) with φ- and ω-scans. A semi-empirical absorption correction was applied to the diffraction data using SADABS. The structure was solved by direct methods using SHELXT and refined against F$^2$ on all data by full-matrix least squares with ShelXle. See, Bruker, SADABS. 2008, L. Krause, R. Herbst-Irmer, G. M. Sheldrick, D. Stalke, J. Appl. Crystallogr. 48, 3 (2015), G. M. Sheldrick, Acta Crystallogr., Sect. A: Found. Adv. 71, 3 (2015), G. M. Sheldrick, Acta Crystallogr., Sect. A: Found. Crystallogr. 64, 112 (2008), and C. B. H¨ubschle, G. M. Sheldrick, B. Dittrich, J. Appl. Crystallogr. 44, 1281 (2011), each of which is incorporated by reference in its entirety. All non-hydrogen atoms were refined anisotropically. All hydrogen atoms were included in the model at geometrically calculated positions and refined using a riding model. The isotropic displacement parameters of all hydrogen atoms were fixed to 1.2 times the U$_{eq}$ value of the atoms they are linked to (1.5 times for methyl groups). [TBA][Cl$_3$SiS] crystallizes with two anions and two cations in the asymmetric unit.

One of the tetrabutylammonium cations was entirely disordered; the disorder was treated with a simple model to restrain chemically equivalent methylene and methyl groups to be the same (SAME command). The other tetrabutylammonium cation showed some disorder in the penultimate methylene and methyl group of two of the n-butyl groups; these were modeled as minor components and restrained to be the same as other n-butyl chains in the other TBA cations (SAME command). One of the trichlorosilylsulfide anions was disordered by a simple rotation along the Si—S axis; this disorder was modeled as a major and minor component. The other trichlorosilyl-sulfide anion showed some spurious electron density around the sulfur and chlorine atoms, but a suitable model to describe the presumed disorder could not be found. It was left as a single anion because the nearby electron density was still low (≤1.03 eA$^{-3}$). Similar-ADP and rigid bond restraints (SIMU and RIGU commands, respectively) were applied to the entire structure.

TABLE 1

X-ray crystallographic information for [TBA] [Cl$_3$SiS]

| | |
|---|---|
| CSD identification code | 1841573 |
| Rociprocal net code | X8_18045 |
| Empirical formula | C$_{16}$H$_{36}$Cl$_3$NSiS |
| Formula weight | 408.96 g/mol |
| Color/morphology | colorless/plate |
| Temperature | 100 (2) K |
| Wavelength | 0.71073 A |
| Crystal system | Monoclinic |
| Space group | P2$_1$/c |
| Unit cell dimensions | a = 17.253 (12) Å α = 90° |
| | b = 15.242 (11) Å β = 103.363 (12)° |
| | c = 18.394 (13) Å γ = 90° |
| Volume | 4706 (6) Å$^3$ |
| Z | 8 |
| Density (calculated) | 1.154 g/cm$^3$ |
| Absorption coefficient | 0.527 mm$^{-1}$ |
| F (000) | 1760 |
| Crystal size | 0.428 × 0.344 × 0.156 mm$^3$ |
| Theta ranges for data collection | 1.755 to 27.877° |
| Index ranges | −22<=h<=22, −20<=k<=20, −24<=l<=24 |
| Reflections collected | 134795 |
| Independent reflections | 11224 |R$_{int}$ = 0.0705| |
| Completeness to θ = 25.242° | 100.0% |
| Absorption correction | Semi-emperical from equivalents |
| Refinement method | Full-matrix least-squares on F$^2$ |
| Data\restraints\parameters | 11224\1420\622 |
| Goodness-of-fit on F$^2$ | 1.032 |
| Final R indices [I > 2σ(I)] | R$_1$ = 0.0582, wR$_2$ = 0.1436 |
| R indices (all data) | R$_1$ = 0.0778, wR$_2$ = 0.1580 |
| Extinction coefficient | n/a |
| Largest diff. peak and hole | 1.025 and −0.754 e · A$^{-3}$ |

During the initial phase of the refinement, all of the atoms bonded to silicon were refined as chlorine atoms. Once the tetrabutylammonium cation disorder and rotation disorder in one of the anions was suitably modeled, the atom with the closest contact to silicon and the least electron density was refined to be the sulfur atom. To further support the assignment of the chlorine and sulfur atoms in the two anions, the model was sequentially modified to switch a sulfur and chlorine atom in the same anion. The weighting scheme was adjusted to convergence, and the R$_1$ and wR$_2$ values were tabulated (Table 2). The original refinement gave the best fit with experiment.

TABLE 2

Values of R$_1$ and wR$_2$ for various refinement models of [TBA] [Cl$_3$SiS].

| Atoms interchanged | R$_1$ | wR$_2$ |
|---|---|---|
| None | 0.0582 | 0.1580 |
| S1↔Cl1 | 0.0605 | 0.1720 |
| S1↔Cl2 | 0.0606 | 0.1700 |
| S1↔Cl3 | 0.0603 | 0.1683 |
| S2↔Cl4 | 0.0597 | 0.1670 |
| S2↔Cl5 | 0.0593 | 0.1655 |
| S2↔Cl6 | 0.0595 | 0.1643 |

The thermal ellipsoid plots shown in FIGS. 14 and 15 were generated from the molecules that showed the smallest amounts of disorder. In the case of the anion, this comprised Si1, S1, Cl1, Cl2 and Cl3. The average Si—Cl bond length and average S—Si—Cl and Cl—Si—Cl bond angles that are described in the manuscript were calculated from the metrical data described in Table 3. The error for the average of these bond metrics was calculated by taking the square root of the sum of the squares of the individual errors.

TABLE 3

Bond metrics used to calculate the average bond metric data for anion [Cl₃SiS]⁻.

| Parameter | Value (Å or °) |
| --- | --- |
| Si1-Cl1 | 2.095 (5) |
| si1-Cl2 | 2.084 (3) |
| si1-Cl3 | 2.040 (4) |
| Si-Cl$_{av.}$ | 2.073 (7) |
| S1-Si1-Cl1 | 117.34 (18) |
| S1-Si1-Cl2 | 114.20 (12) |
| S1-Si1-Cl3 | 115.24 (12) |
| S-Si-Cl$_{av.}$ | 115.59 (25) |
| Cl1-Si1-Cl2 | 101.12 (19) |
| Cl2-Si1-Cl3 | 103.06 (13) |
| Cl3-Si1-Cl1 | 103.9 (2) |
| Cl-Si-Cl$_{av.}$ | 102.69 (30) |

Figure 10:
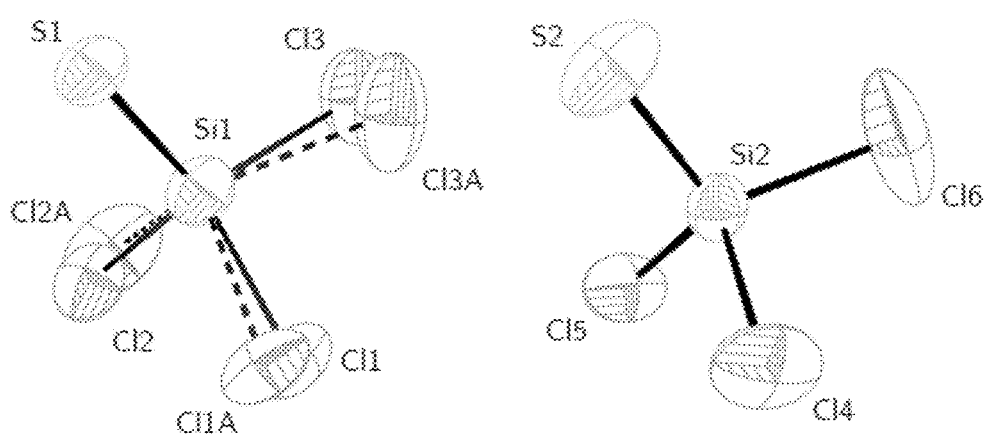
FIG. 10 is a schematic of the molecular structure of the two anions in the asymmetric unit of [TBA][C$_3$SiS]. The thermal ellipsoids are shown at the 50% probability level.
Figure 11:
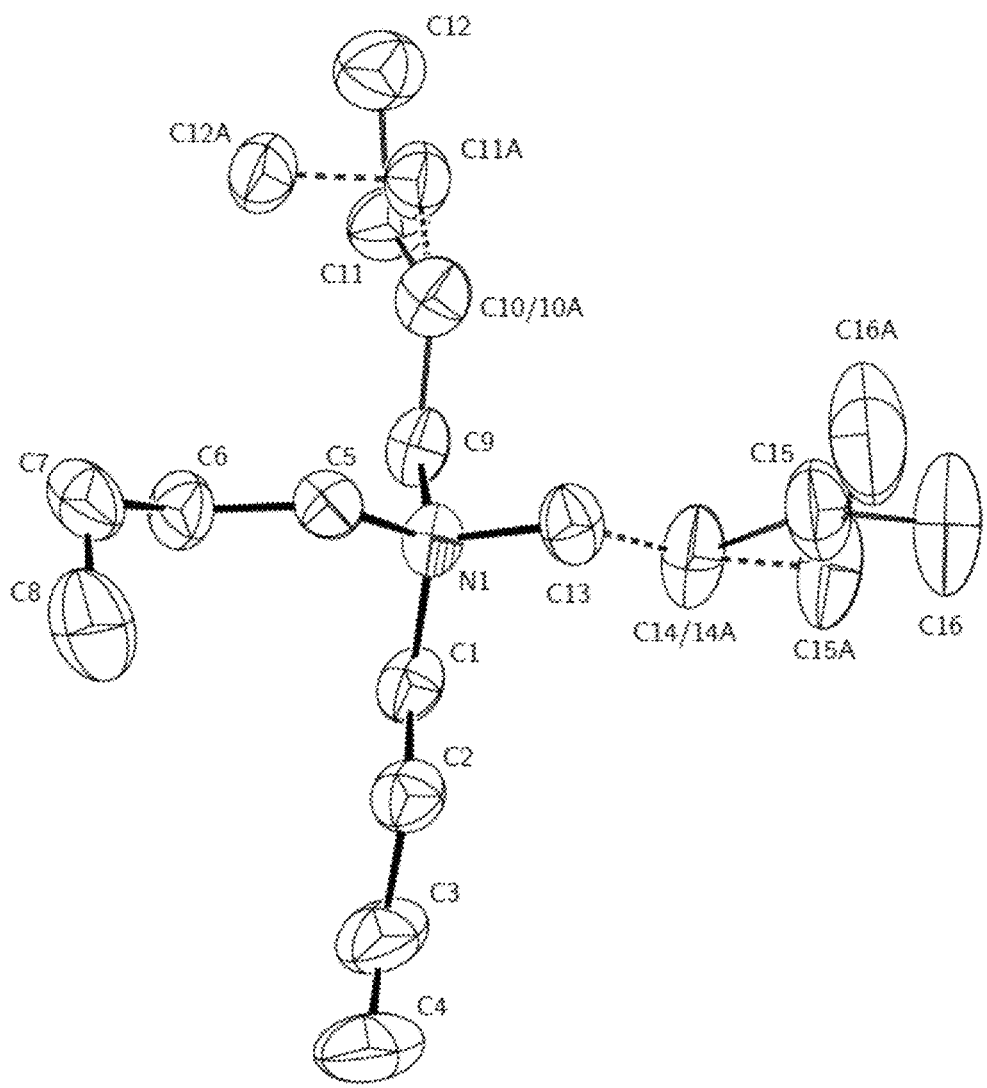
FIG. 11 is a schematic of the molecular structure of one of the tetrabutylammonium cations of [TBA][C$_3$SiS]. Hydrogen atoms have been omitted for clarity and the thermal ellipsoids are shown at the 50% probability level.

See, FIGS. 10 and 11.

Figure 12:
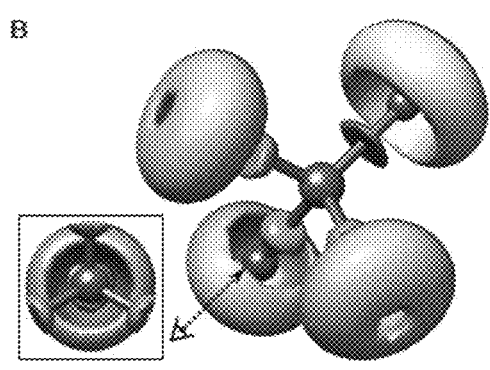
FIG. 12 is a schematic showing a plot of the 0.83 ELF isosurface of [Cl$_3$SiS]$^-$. Yellow: sulfur lone pair basins; green: chlorine lone pair basins; blue: silicon-sulfur bonding basin; magenta: silicon-chlorine bonding basins. B (inset): view of the ELF isosurface down the C$_3$ axis of [Cl$_3$SiS]$^-$. showing the shape of the Si—S bonding basin (blue).

This bond length contraction indicatesdelocalization of the sulfide lone pairs into the three σ*(Si—Cl) orbitals. This orbital interaction is visually represented by the electron localization function (ELF) 0.83 isosurface (FIG. 12), in which the silicon-sulfur bonding basin displays C₃ symmetry, with increased valance shell electron density anti to the Si—Cl bonds.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A method of manufacturing a silyl sulfide comprising contacting a sulfate-source with a silane reducing agent to produce the silyl sulfide.

2. The method of claim 1, wherein the sulfate-source is a bisulfate.

3. The method of claim 2, wherein the bisulfate is a bisulfate salt or is a bisulfate produced in situ from a sulfate salt and an acid or sulfuric acid and a base.

4. The method of claim 1, wherein the silyl sulfide is a salt including the silyl sulfide is an anion and a cation.

5. The method of claim 1, wherein the silane reducing agent is $H_nSiX_{4-n}$ where X is a halogen, a pseudohalogen, alkoxy, aryloxy, amido or arylamido and n is 1, 2, 3 or 4.

6. The method of claim 4, wherein the silyl sulfide is $[X_3SiS]^-$ wherein X is a halogen, a pseudohalogen, alkoxy, aryloxy, amido or arylamido.

7. The method of claim 4, wherein the cation includes a nitrogen-based cation, a phosphorus-based cation, an alkali metal cation, an alkali-earth metal cation, or an ionic liquid cation.

\* \* \* \* \*